United States Patent [19]
Schieve

[11] Patent Number: 6,018,808
[45] Date of Patent: Jan. 25, 2000

[54] METHOD AND APPARATUS FOR TESTING HARDWARE INTERRUPT SERVICE ROUTINES IN A MICROPROCESSOR

[75] Inventor: Eric W. Schieve, Austin, Tex.

[73] Assignee: Advanced Micro Devices, Inc., Travis County, Tex.

[21] Appl. No.: 08/253,480

[22] Filed: Jun. 3, 1994

[51] Int. Cl.[7] .................................................. G06F 13/00
[52] U.S. Cl. ............................................. 714/36; 714/30
[58] Field of Search .................................. 371/15.1, 16.1, 371/16.5; 395/575, 700, 500; 714/36, 30

[56] References Cited

U.S. PATENT DOCUMENTS

| | | | |
|---|---|---|---|
| 5,182,811 | 1/1993 | Sakamara | 395/800 |
| 5,230,052 | 7/1993 | Dayan et al. | 395/700 |
| 5,245,615 | 9/1993 | Tren | 371/16.5 |
| 5,291,585 | 3/1994 | Sato et al. | 395/500 |

Primary Examiner—Robert W. Beausoliel, Jr.
Assistant Examiner—Norman Michael Wright

[57] ABSTRACT

A read/writable memory formed in the same semiconductor chip as a microprocessor is employed in testing a plurality of hardware interrupt service routines initiated by corresponding devices (and components of devices) during a power-on, self-test(POST) of a computer system. The POST is set in the read-only memory(ROM) of the computer system. The read/writable memory, which is ordinarily inoperative during the POST, is used for storing a diagnostic interrupt vector table, which has a list of interrupt numbers and corresponding addresses of the respective interrupt routines. This table is normally subject to change because each device and each of its components have different interrupt service routines, requiring different addresses for the same interrupt number. The random access memory (RAM) has not yet been tested in the POST, and is not regarded as reliable for the hardware interrupt testing and therefore the read/writable memory is used for such testing.

12 Claims, 1 Drawing Sheet

METHOD AND APPARATUS FOR TESTING HARDWARE INTERRUPT SERVICE ROUTINES IN A MICROPROCESSOR

BACKGROUND OF THE INVENTION

1. Field of the Invention

The present invention relates to the utilization of read/writable memory located in a semiconductor chip with a microprocessor which can be read from and written to prior to the completion of a computer system's power-on, self-test program(POST). More particularly, it relates to the use of the read/writable memory for hardware interrupt routine testing.

2. Description of the Related Art

When a computer system is turned on, it typically implements a POST program to verify the functionality of its components. Conventionally, it has been assumed that prior to the verification of a computer system's main random access memory(RAM), no reliable read/writable memory is available to the system other than a component microprocessor's few internal registers. As a result of the perceived lack of reliable read/writable memory, hardware interrupt routines have been difficult to test.

When a failure occurs in the testing of hardware interrupt routines (or any other POST testing), the POST should identify as precisely as possible which component has failed. Precise component failure identification is beneficial because it results in more cost-effective effective and efficient repairs. Illustratively, when using the POST, a failure often can only be isolated to several suspect components. To repair this failure requires either 1) replacing all the suspect components; or 2) conducting additional testing to determine which of the suspect components is faulty and replacing it. The amount of additional testing and/or replacement of components required is dependent upon the number of suspect components. Consequently, more precise tests result in fewer suspect components and more cost-effective and efficient repairs.

To accomplish precise fault identification, the POST should ideally be performed in a "crawl out" sequence, that is, a component must first be tested before it is used to test other components. This methodology yields a chronological hierarchy of testing, starting with the most fundamental components and building through more complex ad dependent ones. A consequence of the "crawl out" sequence is the necessary assumption that the bare minimum components needed to implement the POST, which is stored in read-only memory(ROM), are functional. These components include the microprocessor, the ROM, and the components necessary for the microprocessor to read the ROM.

Reliable read/writable memory is memory whose functionality has been verified pursuant to the "crawl out" sequence. The major and often the only source of read/writable memory available to a computer system is the main RAM. A problem arises in that the main RAM is dependent on many other components, and therefor should be tested late in the "crawl out" sequence. Because the main RAM must be regarded as unreliable until tested, no read/writable memory has been though to be reliable prior to the verification of the main RAM except for the microprocessor's few internal registers.

This lack of reliable read/writable memory has made testing of hardware interrupt routines difficult. Hardware interrupts are the communication pathways between the microprocessor and different hardware devices and components thereof. In a typical personal computer (PC) architecture which may utilize, for example, an Am386 microprocessor, interrupts are handled in the following fashion. A device connects to a chained pair of programmable interrupt controllers(PIC) via one of fifteen interrupt request lines(IRQs). When a device needs servicing, it initiates an interrupt by sending a signal on the appropriate IRQ line. The signal is received by the PIC and converted into an eight bit interrupt number which identifies the IRQ line. The PIC, in turn, is connected to the microprocessor and sends it the eight bit interrupt number. Upon receipt of the interrupt number, the microprocessor 1) stores the information necessary to return to the job from which it is interrupted and 2) converts the interrupt number into an interrupt vector table address for that particular device. The vector table address specifies a location in an interrupt vector table where a physical, interrupt handler address may be found. The interrupt vector table may be located in either the system ROM or RAM, but as described below, RAM is ordinarily preferable.

The computer program located at the physical handler address is the interrupt service routine which is used to service an interrupt. In this manner, the microprocessor has used the interrupt vector table to translate an interrupt number into the physical address of an interrupt service routine.

Many devices are capable of generating a number of different types of interrupts on the same IRQ line. In a diagnostic environment each type of interrupt will require its own interrupt service routine and therefore its own interrupt vector. The result is that the interrupt vector table changes for each different type of interrupt. The interrupt vector table is therefore ordinarily set in RAM where such changes may be readily made. The microprocessor then implements whichever interrupt service routine is located at the physical address it reads from the interrupt vector table. The interrupt service routine services the interrupt and, upon completion, the microprocessor reloads the job information and returns to processing the interrupted job.

In testing the interrupts during POST, a problem arises in that the interrupt vector table may be very large to accommodate the multiplicity of different types of interrupts. The table needs frequent updating and modification. However, as indicated earlier, main RAM cannot be tested early in the POST and therefore cannot be regarded as reliable at that point in POST when interrupt testing is to be done. One non-optimal solution to the problem is to reproduce in ROM all of the different permutations of the interrupt vector tables required by the multiplicity of different types of interrupts. This is an extremely space inefficient solution that could require a large amount of valuable ROM space. Consequently, to perform a proper "crawl out" sequence, testing of the hardware interrupts should be completed before that of the main RAM. As a result, it has been conventionally assumed that no reliable read/writable memory was available to store the interrupt vector table for hardware interrupt testing. Therefore, hardware interrupt testing was not implemented without either relying on the untested main RAM, or using large amounts of ROM to store the interrupt vector table. The technique of using the untested main RAM is unsatisfactory because, if a fault is indicated, it is not discernable as to whether the fault is in the RAM or in the interrupt hardware. The technique of using ROM for storing the interrupt vector table yields a more precise fault identification. However, ROM is not readily modifiable and therefore large amounts of ROM must be used to store the multiple interrupt vector tables required to service multiple component devices.

SUMMARY OF THE INVENTION

This invention overcomes the lack of available RAM prior to the completion of the POST through the novel use of the read/writable memory, that is ordinarily not used until after completion of the POST, for storing the interrupt vector table (among other possible uses). The read/writable memory then provides an alterable table for hardware interrupt testing.

The principle object of this invention is to use the read/writable memory prior to completion of the POST for testing hardware interrupt routines.

This and other objects will be made evident in the detailed description that follows.

DETAILED DESCRIPTION OF THE INVENTION

In this preferred embodiment, an Am386 microprocessor is described, but is representative of other microprocessors as well.

Figure 1:
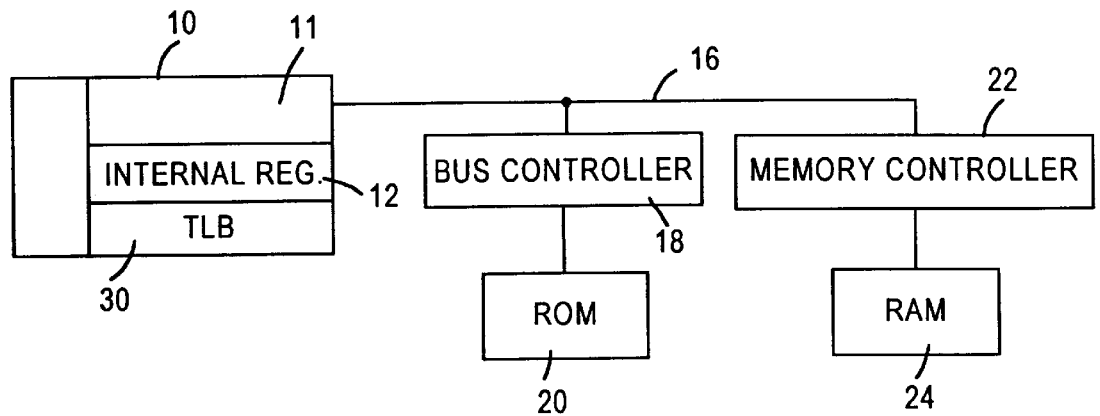
FIG. 1 is a block diagram of a microprocessor and its associated memory.

FIG. 1 shows microprocessor 10 with internal registers 12 and page mode translation look-aside buffer(TLB) 30. TLB 30 is the pertinent read/writable memory of this invention. Connected to microprocessor 10 via the host bus 16 are bus controller 18 and memory controller 22. ROM 20 connects through bus controller 18 and main RAM connects through memory controller 22.

TLB 30 is cache memory which is ordinarily used as a buffer for quick translation of paging operations (cache memory is a type of RAM and is read/writable). This use is available after conclusion of the POST. TLB 30 is organized as a 4-way set associative 32-entry page table cache. TLB 30 has 20 bit linear addresses indexed to corresponding 20 bit physical addresses. Although TLB 30 cannot be accessed during normal operations, it can be accessed for testing purposes during the POST. The novelty in this invention lies in the accessing of TLB 30 during POST for purposes other than its own testing. In this preferred embodiment, TLB 30 is loaded with interrupt vectors, i.e., addresses of interrupt routines during POST.

Figure 2:
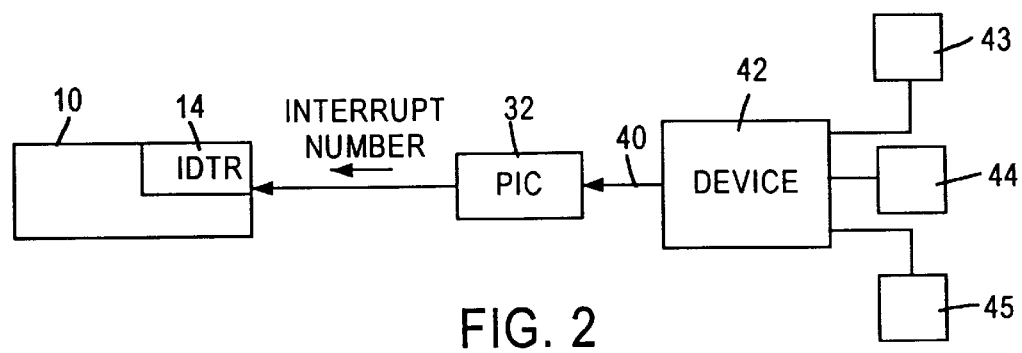
FIG. 2 is a block diagram of the hardware interrupt communications pathways.

FIG. 2 illustrates microprocessor 10 having interrupt descriptor table register(IDTR) 14 which is used for storing an address for pointing to the interrupt vector table in normal operation, and to the diagnostic interrupt vector table 50 (see FIG. 3) in ROM during interrupt routine testing.

Device 42 is shown having functional subcomponents 43–45, each of which may require its own different interrupt routine. Device 42 is shown connected to PIC 32 by way of IRQ line 40. Pic 32 has an output connecting it to microprocessor 10 for transmission of the eight bit interrupt numbers which are converted by microprocessor 10 into vector table addresses.

Figure 3:
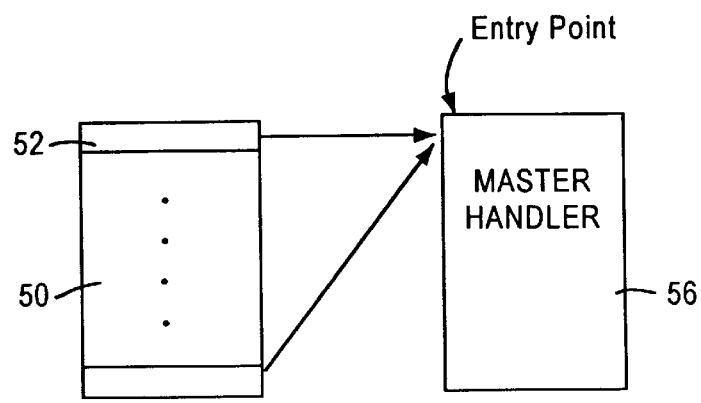
FIG. 3 is a block diagram of the ROM diagnostic interrupt vector table and the master handler.

FIG. 3 shows ROM diagnostic interrupt vector table 50 set in ROM, having addresses 52 entered. Table 50 receives vector table addresses, and is connected to master handler 56, set in the POST, which identifies a coded interrupt number. The output of master handler 56 is applied to TLB 30 to select the appropriate physical handler for performing the interrupt.

MODE OF OPERATION OF THE INVENTION

Referring first to FIG. 2, assume that subcomponent 43 of device 42 is selected for testing. The program that selects subcomponent 43 and initiates an interrupt request is the computer program illustrated in source code in Appendix A. The interrupt signal from subcomponent 43 is sent to PIC 32 over IRQ line 40 (1 of 15 in this preferred embodiment). PIC 32 forms an 8 bit interrupt number representative of the interrupting device—device 42 in this case, but requiring the physical address of the interrupt routine for subcomponent 43 to be appended in the diagnostic interrupt vector table loaded in TLB 30 (FIG. 3). The loading of TLB 30 is done by the program shown in Appendix A and is a preliminary step in the testing of the hardware interrupts. Also, IDTR register 14 is loaded with the address of the ROM diagnostic interrupt vector table 50.

Referring again to FIG. 2, microprocessor 10 receives the 8 bit interrupt number from PIC 32 and translates it into the vector table address. That address enables activation of ROM diagnostic interrupt vector table 50 (FIG. 3). In a normal environment, when microprocessor 10 receives the 8 bit interrupt number, it also stores the information on which it was working in its internal registers. Upon completion of the service routine, the information is retrieved. In the absence of RAM in the diagnostic environment, master handler 56 causes the storing of pertinent information relative to that on which microprocessor 10 had been working when the interrupt occurred. This storage is done in arbitrarily selected general purpose register 11 (FIG. 1). Upon the completion of the interrupt service routine, master handler 56 reads the contents of register 11 to continue the diagnostic routine.

In FIG. 2, it can be seen that the interrupt vector for device 42 is referenced by microprocessor 10 through its IDTR 14. The interrupt vector is sent to master handler 56. The details of master handler 56, set in ROM, is shown in Appendix A. Through master handler 56, the interrupt vector is recognized and referenced to TLB 30 (FIG. 2).

While this invention has been described in specific steps and in specific hardware and software, it is contemplated that those skilled in the art will readily recognize that numerous variations and substitutions may be made to the invention to achieve substantially the same results as achieved in the preferred embodiment. Such variations and substitutions could be to the method steps as well as to the hardware. Therefor, the detailed description is to be clearly understood as being given by way of illustration and example only. The spirit and scope of the present invention is to be limited only by the appended claims.

APPENDIX A

```
                    IDEAL
                    INCLUDE     "system.inc"
                    EXTRN       sys_init         : NEAR
                    EXTRN       reg_tests        : NEAR
                    EXTRN       PIC_sanity       : NEAR
                    EXTRN       timer_sanity     : NEAR
                    EXTRN       RTC_sanity       : NEAR
                    EXTRN       RTC_vs_timer     : NEAR
                    EXTRN       RTC_int          : NEAR
                    EXTRN       CMOS_test        : NEAR
                    EXTRN       video_tests      : NEAR
                    EXTRN       EMS_tests
SEGMENT             DIAGS_CODE USE16 PUBLIC 'CODE'
                    ASSUME cs:DIAGS_CODE,ds:DIAGS_CODE
; *************************** driver ****************************************
; description:      This is the main test driver for the ELAN emulation diagtiostics.
;                   The driver label should be located at DIAGS_CODE:0 so that it can
;                   be jumped to from the reset code.
;
;
;                   the driver is an endless loop calling tests from the DPOST_tbl and
;                   displaying their result status to port 80h. Execution terminates only
;                   when an error condition has been detected.
;
;                   The normal test process is as follows:
;                   1.  Point to test N in the DPOST_tbl.
;                   2.  Display the test's port 80h ID for 1s.
;                   3.  Call test N.
;                   4.  Disable INTR and restore DS to GDTD_DIAGS.
;                   5.  Examine test's status. If undefined it's an error. Use test
;                       status to look up a corresponding port 80h code.
;                   6.  Display port 80h result status and hold for 1s.
;                   7.  Increment test pointer (N=N+1) and wrap if end of test list.
;                   8.  Go to step 1.
;
;                   The error handling procedure is as follows:
;                   1.  Display the failure type code (error, spurious interrupt
;                       or unexpected interrupt) and hold 1s.
;                   2.  Display the failure mpdifier code and hold 1s.
;                       -      ERROR failure type code: The modifier will
;                              be the test subsection indicator (SET_ERC #)
;                       -      UNEXP_INT failure type code: The modifier will be the
;                              unexpected iterrupt #, either software 0–1F, or hardware
;                              20–2F.
;                       -      SPUR_INT failure type code: The modifier will indicate which
;                              PIC the spurious interrupt arrived at (0 master, 1 slave).
;                   3.  Display the test ID code and hold for 1s.
;                   4.  Go to step 1.
; sys regs:         dr0         . . . General purpose scratch register.
;                   dr1         . . . Holds system bit flag.
;                   dr2         . . . IRQ bit flags.
;                   dr3         . . . TLB stack pionter.
;                   cr2         . . . Holds test ID code in byte1, failure modifier in byte0.
;                   tr6
;                   tr7         . . . Used to access TLB interrupt vectors and TLB stack.
;
; history:          08/17/93  -  Eric W. Schieve  -  Created.
; ***************************************************************************
                    PUBLIC      signature
                    PUBLIC      SIGN_LEN
                    PUBLIC      driver
driver:             mov         al,DIAGS_IN_80       ;DIAGS entry code for port 80h.
                    out         80h,al               ;Announce that diags has been entered.
                    jmp         over_sign            ;skip signature
signature           DB          "AMD ELAN"
SIGN_LEN            = $ - signature
over_sign:          mov         eax,dr1                            ;get status register
                    and         eax,NOT MASK STAT_TSTIX            ;zero test index (AL)
                    mov         dr1,eax                            ;save status register
DPOST_loop:         mov         ah,SIZE proctbl                    ;# of bytes in proctbl structure
                    mul         ah                                 ;AX contains offset into DPOST_tbl+bx
                    mov         bx,ax
                    mov         cx,[(proctbl PTR DPOST_tbl+bx).proc_addr]  ;get test procedure addr
                    mov         dl,[(proctbl PTR DPOST_tbl+bx).test_ID]    ;get port 80h ID for cur
; Display port 80h code at before the test is called. Wait –1s before calling the
; test so that user can see ID code.
                    SET_ID      dl                                 ;signal test entry at last possible
                    DELAY       DLYSEC                             ;Wait so user can see test code.
```

APPENDIX A-continued

```
; Jump to the test. Use ROM stack to allow NEAR RETs from tests.
                mov         sp,OFFSET test_retptr       ;Point to ROM stack.
                jmp         cx                          ;Call the test.
test_retptr:    DW          OFFSET, test_ret            ;NEAR return addr.
test_ret:       mov         cx,GDTD_DIAGS               ;make sure DS is correct. just in case
                mov         ds,cx                       ;turkey has screwed it up
                cli                                     ;same reason as above
; Any unrecognized return code must be treated as a failure. Index into a tabla of
; port 80h status codes in the 6xh range.
                mov         bx,ERROR                    ;Reuult code in si.
                cmp         ax,0                        ;SUCCESS?
                jb          disp_res_80h                ;out of bounds (-), so ERROR.
                cmp         ax,RES80TBL_SIZ
                ja          disp_res_80h                ;out of bounds (+), so ERROR
                mov         bx,ax                       ;return code is OK.
; Display port 80h result code and delay -ls for user to see it.
disp_res_80h:   mov         bl,[res_80h_tbl+bx]         ;Get port80h result code.
                cmp         bl,ERROR_80
                jz          err_proc                    ;If ERROR let err_proc handle display
                mov         al,bl
                out         80h,al
                DELAY       DLYSEC
                mov         eax,O
                mov         cr2,eax                     ;zero result register
                mov         eax.dr1
                inc         al                          ;increment test number
                cmp         al,NUM_DPOST_TSTS           ;have we reached the end of the test
                jne         save_status;                ;If not, save test number
                mov         eax.drl
                mov         al,(DPOST_repeat - DPOST_tbl) / SIZE proctbl    ;reset the test number to
save_status;    mov         drl.eax                     ;save status register
                jmp         DPOST_loop                  ;the never-ending loop
; ****************************************************************************
;   If a test failed, we end up here - loop on failure type code, failure modifier code
;   and port 80h test ID.
; ****************************************************************************
                PUBLIC      err_proc
err_proc:       mov         al,bl                       ;Display failure type code.
                out         80h,al
                DELAY       DLYSEC
                mov         eax,cr2                     ;Display failure modifier code.
                out         80h,al
                DELAY       DLYSEC
                mov         eax,cr2                     ;Display test ID code.
                mov         al,ah
                out         80h,al
                DELAY       DLYSEC
                jmp         err_proc                    ;Do it al again.
; ****************************************************************************
; description:  Software exception handler. INTS 0 - 1Fh. These are treated as unexpected
;               interrupts indicating catastrophic CPU events. These generate a call to
;               the driver's error handler procedure. The UNEXP_INT failure code, the
;               interrupt # and test-in-progress's ID will be cyclically displayed to port
;               80h by the error handler.
;
; history:      08/13/93  -  Eric W. Schieve  -  Created.
; ****************************************************************************
int_0:          mov         bx,0
                jmp         SW_int
int_1:          mov         bx,1
                jmp         Sw_int
int_2:          mov         bx,2
                jmp         SW_int
int_3:          mov         bx,3
                jmp         SW_int
int 4:          mov         bx,4
                jmp         SW_int
int_5:          mov         bx,5
                jmp         SW_int
int_6:          mov         bx,6
                jmp         SW_int
int 7:          mov         bx,7
                jmp         SW_int
int_8:          mov         bx,8
                jmp         SW_int
int_9:          mov         bx,9
                jmp         SW_int
int_A:          mov         bx,0Ah
                jmp         SW_int
```

APPENDIX A-continued

```
int_B:          mov     bx,0Bh
                jmp     SW_int
int_C:          mov     bx,0Ch
                jmp     SW_int
int_D:          mov     bx,0Dh
                jmp     SW_int
int_E:          mov     bx,0Eh
                jmp     SW_ints
int_F:          mov     bx,0Fh
                jmp     SW_int
int_10:         mov     bx,10h
                jmp     SW_int
int_11:         mov     bx,11h
                jmp     SW_int
int_12:         mov     bx,12h
                jmp     SW_int
int_13:         mov     bx.13h
                jmp     SW_int
int_14:         mov     bx,14h
                jmp     SW_int
int_15:         mov     bx,15h
                jmp     SW_int
int_16:         mov     bx,16h
                jmp     SW_int
int_17:         mov     bx,17h
                jmp     SW_int
int_18:         mov     bx,18h
                jmp     SW_int
int_19:         mov     bx,19h
                jmp     SW_int
int_1A:         mov     bx,1Ah
                jmp     SW_int
int_1B:         mov     bx,1Bh
                jmp     SW_int
int_1C:         mov     bx,1Ch
                jmp     SW_int
int_1D:         mov     bx,1Dh
                jmp     SW_int
int_1E:         mov     bx,1Eh
                jmp     SW_int
int_1F:         mov     bx,1Fh
SW_int:         mov     al,0FFn
                out     PIC_MASTER+1.al            ;write IMR (PICO) (mask all interrupts)
; Set interrupt number in b0 of CR2.
                mov     eax,cr2
                mov     al,bl                      ;Unexpected int # in b0 of cR2
                mov     cr2,eax
                mov     bl,UNEXP_INT_80            ;Sets error type to UNEXP_INT_80 (unexpected interrupt)
                jmp     err_proc
;*********************************************************************************
;  inputs:      BP - should have been preset to contain the NEAR return address within
;               a wait loop.
;
;               A table of 16 vectors should be established in the TLB al linear
;               addresses 20xxxh-2Fxxxh. If an interrupt does not require an ISR
;               (setting the IRQ flag in DR2 is sufficient) then a vector value of
;               0 should be installed in the TLB vector table.
;
;  description: Hardware interrupt handler. INTs 20h-2Fh.
;
;  NOTE:        Interrupts are NOT! NOT! NOT! re-enabled at the end of tje ISR. This must
;               be done after returning (jmp bp) to the interrupted routine.
;
;  outputs:     An IRQ flag will be set in DR2 indicating the IRQ that occurred.
;
;  history:     08/13/93  -  Eric W. Schieve  -  Created.
;*********************************************************************************
                PUBLIC   HWi_x
int_20:         mov     bx,20h
                jmp     HW_int
int_22:         mov     bx,22h
                jmp     HW_int
int_23:         mov     bx,23h
                jmp     HW_int
int_24:         mov     bx,24h
                jmp     HW_int
int_25:         mov     bx,25h
                jmp     HW_int
int_26:         mov     bx,26h
```

APPENDIX A-continued

```
                jmp     HW_int
int_27:         mov     bx,27h
                jmp     HW_int
int_28:         mov     bx,28h
                jmp     HW_int
int_29:         mov     bx,29h
                jmp     HW_int
int_2A:         mov     bx,2Ah
                jmp     HW_int
int_2B:         mov     bx,2Bh
                jmp     HW_int
int_2C:         mov     bx,2Ch
                jmp     HW_int
int_2D:         mov     bx,2Dh
                jmp     HW_int
int_2E:         mov     bx,2Eh
                jmp     HW_int
int_2F:         mov     bx,2Fh
HW_int:         PUSHTLB ax
                PUSHTLB cx
                PUSHTLB dx
                mov     dx,PIC_MASTER
                test    bl,1000b                ;Was the int from master or slave PIC?
                jz      chk_lvl_7               ;If master, check for level 7 interrupt.
                mov     dx,PIC_SLAVE            ;Else it was a slave interrupt.
chk_lvl_7:      mov     al,bl
                and     al,111b                 ;Look at interrupt level from FIC.
                cmp     al,7                    ;Could it be a level 7 (spurious).
                jne     set_IRQ_flg             ;If not, it's a real int.
                mov     al,0Bh                  ;OCW3 to enable a read of IS bits.
                out     dx,al                   ;Send OCW3
                in      al,dx                   ;Read IS bits.
                test    al,10000000b            ;Is level 7 IS bit set?
                jnz     set_IRQ_flg             ;If so, it's not spurious.
                mov     eax,cr2
                test    bl,1000b                ;Which PIC was the spurious int on?
                setnz   al                      ;Set failure modifier for 0 (PIC0) or 1 (PIC1).
                mov     cr2,eax
                mov     bl,SPUR_INT_80          ;Sets error type to SPUR_INT_80 (spurious interr
                jmp     err_proc
set_IRQ_flg:    mov     ecx,ebx                 ;Save HW int #
                and     ecx,0Fh                 ;Get IRQ #
                mov     eax,dr2                 ;Get IRQ flags.
                bts     eax,ecx
                mov     dr2,eax                 ;Set IRQ active flag.
                movzx   ecx,bx                  ;Zap upper WORD of ebx.
                shl     ecx,12                  ;Turn INT # into a linear address
                or      cl,l                    ;Set Command bit.
                mov     tr6,ecx                 ;Select linear address for TLB lookup.
                mov     ecx,tr7                 ;Read physical address (really 2o bits of int ve
                test    cl,10000b               ;Is PL bit set (was the lookup a hit)?
                jnz     TLB_hit                 ;If so, hit.
                mov     ecx,cr2                 ;Else, we have no vector in TLB for this IRQ.
                mov     cl,bl                   ;Unexpected HW int # in b0 of cR2
                mov     cr2,ecx
                mov     bl,UNEXP_INT_80         ;Sets error type to UNEXP_INT_80 (unexpected int
                jmp     err_proc                ;If no vector then haul ass to error handler.
TLB_hit:        shr     ecx,12                  ;Get INT vector.
                jnz     HWi_vect                ;If non-NULL jwnp to it.
                mov     al,20h
                out     PIC_MASTER,al
                out     PIC_SLAVE,al            ;EOIs.
                jmp     HWi_x                   ;Bail.
HWi_vect:       jmp     cz                      ;Jump to the ISR.
HWi_x:          POPTLB  dx
                POPTLB  cx
                POPTLB  az
                add     sp,6                    ;Restore SP.
                jmp     bp                      ;Return address in bp
;************************************************************************************
; Port 80h result translation table. Maps test return codes to port 80h result codes.
;************************************************************************************
res_80h_tbl     DB      SUCCESS_80
                DB      NA_80
                DB      WRN_80
                DB      ERROR_80
RES80TBL_SIZ    =       $ -res_80h_tbl
; ----------------------------------------------------------------------------------
;  DPOST (Diagnostic POST) procedure table.
```

APPENDIX A-continued

```
;_____
;                       TEST                             PORT 80h ID
;-------------------------------------------------------------------------------
                ALIGN       4
LABEL           DPOST_tbl           BYTE
                <sys_init.          SYS_INIT_80>                        ;disable reset button
LABEL           DPOST_repeat        BYTE
                proctbl <reg_tests,         REG_80>
                proctbl <PIC_sanity,        PIC_1_80>
                proctbl <timer_sanity,      TIMER_1_80>
                proctbl <RTC_sanity,        RTC_1_80>
                proctbl <RTC_vs_timer,      RTC_VS_T_80>
                proctbl <cmos_TEST,         RTC_CMOS_80>
                proctbl <video_tests,       VIDEO_80>
                proctbl <EMS_tests,         EMS_80>
;               proctbl <timerl_sanity,     TIMER_C_80>     ;Timer 1 sanity check
;               proctbl <RTC_sanity,        RTC_C_80>       ;RTC sanity check
;               proctbl <RTC_vs_timer.      R_VS_T_80>      ;RTC vs. Timer 1 check
;               proctbl <RTC_test,          RTC_80>         ;RTC test
;               proctbl <PIC_test_1,        PIC_1_80>       ;PIC test 1
;               proctbl <timer_test,        TIMER_2_80>     ;Programmable Interval Timer test
;               proctbl <PIC_test_2,        PIC_2_80>       ;PIC test 2
;               proctbl <ram_cfg,           RAM_CFG_80>     ;RAM configuration routine
;               proctbl <glue_testa,        TESTA_80>       ;RAM tests test
;               proctbl <glue_dataline,     DATALINE_80>    ;RAM dataline test
;               proctbl <glue_burst,        BURST_80>       ;RAM bursting tests
;               proctbl <glue_misDWORD,     MISWORD_80>     ;RAM misaligned transfer tests
;               proctbl <glue_misBURST,     MISBURST_80>    ;RAM misaligned transfer tests
;               proctbl <glue_page_miss,    PAGEMISS_80>    ;RAM RAS/CAS timing tests
;               proctbl <glue_chaos,        CHAOS_80>       ;RAM chaos test
;               proctbl <glue_fdc,          FDC_80>         ;Floppy controller test
;               proctbl <fbs_pres_test,     FBS_PRES_80>    ;Floppy boot sector presence test
;               proctbl <HDC_test,          HDC_80>         ;Hard-disk controller test
;               proctbl <HDbs_pres,         HBS_PRES_80>    ;Hard-disk boot sector presence test
NUM_DPOST_TSTS = (S - DPOST_tbl) / SIZE proctbl
;-------------------------------------------------------------------------------
;   ROM Interrupt Descriptor Table
;-------------------------------------------------------------------------------
                PUBLIC      ROMIDT
                PUBLIC      ROM_IDT_SIZE
LABEL           ROMIDT      BYTE
                idesc   <int_0,GDTC_DIAGS,,86h,>            ;INT 0
                idesc   <int_1,GDTC_DIAGS,,86h,>            ;INT 1
                idesc   <int_2,GDTC_DIAGS,,86h,>            ;INT 2
                idesc   <int_3,GDTC_DIAGS,,86h,>            ;INT 3
                idesc   <int_4,GDTC_DIAGS,,86h,>            ;INT 4
                idesc   <int_5,GDTC_DIAGS,,86h,>            ;INT 5
                idesc   <int_6,GDTC DIAGS,,86h,>            ;INT 6
                idesc   <int_7,GDTC_DIAGS,,86h,>            ;INT 7
                idesc   <int_8,GDTC_DIAGS,,86h,>            ;INT 8
                idesc   <int_9,GDTC_DIZAGS,,86h,>           ;INT 9
                idesc   <int_A,GDTC_DIAGS,,86h,>            ;INT 0Ah
                idesc   <int_B,GDTC_DIAGS,,86h,>            ;INT 0Bh
                idesc   <int_C,GDTC_DIAGS,,86h,>            ;INT 0Ch
                idesc   <int_D,GDTC_DIAGS,,86h,>            ;INT 0Dh
                idesc   <int_E,GDTC_DIAGS,,86h,>            ;INT 0Eh
                idesc   <int_F.GDTC_DIAGS,,86h,>            ;INT 0Fh
                idesc   <int_10,GDTC_DIAGS,,86h,>           ;INT 10h
                idesc   <int_11,GDTC_DIAGS,,86h,>           ;INT 11h
                idesc   <int_12,GDTC_DIAGS,,86h,>           ;INT 12h
                idesc   <int_13,GDTC_DIAGS,,86h,>           ;INT 13h
                idesc   <int_14,GDTC_DIAGS,,86h,>           ;INT 14h
                idesc   <int_15,GDTC_DIAGS,,86h,>           ;INT 15h
                idesc   <int_16,GDTC_DIAGS,,86h,>           ;INT 16h
                idesc   <int_17,GDTC DIAGS,,86h,>           ;INT 17h
                idesc   <int_18,GDTC_DIAGS,,86h,>           ;INT 18h
                idesc   <int_19,GDTC_DIAGS,,86h,>           ;INT 19h
                idesc   <int_1A,GDTC_DIAGS,,86h,>           ;INT 1Ah
                idesc   <int_1B,GDTC_DIAGS,,86h,>           ;INT 1Bh
                idesc   <int_1C,GDTC_DIAGS,,86h,>           ;INT 1Ch
                idesc   <int_1D,GDTC_DIAGS,,86h,>           ;INT 1Dh
                idesc   <int_1E,GDTC_DIAGS,,86h,>           ;INT 1Eh
                idesc   <int_1F,GDTC_DIAGS,,86h,>           ;INT 1Fh
                idesc   <int_20,GDTC_DIAGS,,86h,>           ;INT 20h (IRQ0)
                idesc   <int_21,GDTC_DIAGS,,86h,>           ;INT 21h (IRQ1)
                idesc   <,GDTC_DIAGS,,6h,>                  ;INT 22h (Not present)
                idesc   <int_23,GDTC_DIAGS,,86h,>           ;INT 23h (IRQ3)
                idesc   <int_24,GDTC_DIAGS,,86h,>           ;INT 24h (IRQ4)
                idesc   <int_25,GDTC_DIAGS,,86h,>           ;INT 25h (IRQ5)
```

APPENDIX A-continued

```
            idesc    <int_26,GDTC_DIAGS,,86h,>              ;INT 26h (IRQ6)
            idesc    <int_27,GDTC_DIAGS,,86h,>              ;INT 27h (IRQ7)
            idesc    <int_28,GDTC_DIAGS,,86h,>              ;INT 28h (IRQ8)
            idesc    <int_29,GDTC_DIAGS,,86h,>              ;INT 29h (IRQ9)
            idesc    <int_2A,GDTC_DIAGS,,86h,>              ;INT 2Ah (IRQ10)
            idesc    <int_2B,GDTC_DIAGS,,86h,>              ;INT 2Bh (IRQ11)
            idesc    <int_2C,GDTC_DIAGS,,86h,>              ;INT 2Ch (IRQ12)
            idesc    <int_2D,GDTC_DIAGS,,86h,>              ;INT 2Dh (IRQ13)
            idesc    <int_2E,GDTC_DIAGS,,86h,>              ;INT 2Eh (IRQ14)
            idesc    <int_2F,GDTC_DIAGS,,86h,>              ;INT 2Fh (IRQ15)
ROM_IDT_SIZE = S-ROMIDT-1
; ----------------------------------------------------------------------------
;   ROM IDT pointer operend for LIDT instruction.
; ----------------------------------------------------------------------------
            PUBLIC   rom_idt_ptr
LABEL                rom_idt_ptr FWORD
            DW       ROM_IDT SIZE           ;idt limit
            DW       OFFSET ROMIDT          ;low WORD of idt addr
            DW       00fEh                  ;hi WORD of idt addr
ENDS
END
```

I claim:

1. A system for testing a plurality of hardware interrupt service routines for a microprocessor prior to the completion of a power-on, self-test (POST) program for the microprocessor, set in a read-only memory (ROM) of the microprocessor, the system incorporating a read/writable memory formed in the same semiconductor chip as the microprocessor and ordinarily inoperative during the POST, the system comprising:

(a) a diagnostic interrupt vector table set in the read/writable memory, the table comprising a plurality of interrupt vectors corresponding to a plurality of hardware interrupt routines, and a physical address for each of the interrupt vectors corresponding to the address of a diagnostic interrupt service routine for that interrupt vector;

(b) means for selecting one of a plurality of devices and for causing the selected device to initiate an interrupt signal;

(c) circuitry for transmitting the interrupt signal to the microprocessor for recognition and storage of the interrupt signal;

(d) means for accessing the read/writable memory for the interrupt signal and reading out the corresponding physical address; and (e) means for performing the diagnostic interrupt service routine.

2. The system of claim 1 wherein the circuitry for transmitting the interrupt signal to the microprocessor comprises:

(c)(i) a plurality of interrupt request lines, each line associated with one of the plurality of devices; and (ii) an interrupt controller connected to the plurality of interrupt request lines for converting the interrupt signal from the selected device on the corresponding interrupt request line to an interrupt number.

3. The system of claim 2 wherein the means for accessing the read/writable memory comprises:

(d)(i) a ROM diagnostic interrupt vector table inserted into the POST, having a list of interrupt vectors corresponding to the interrupt numbers and an output responsive to selection of the interrupt vector of the selected device, represented as a coded interrupt number;

(ii) a master handler inserted into the POST, connected to respond to the output of the ROM diagnostic interrupt vector table by recognizing the coded interrupt number and applying the coded interrupt number to the diagnostic interrupt vector table set in the read/writable memory.

4. The system of claim 3 wherein the means for performing the diagnostic interrupt service routine is a program set into the POST.

5. The system of claim 4 wherein the means for assessing the read/writable memory further comprises:

(d)(iii) an interrupt descriptor table register for entering the address of the ROM diagnostic interrupt vector table by the microprocessor.

6. The system of claim 1 wherein the means for performing the diagnostic interrupt service routine is a program set into the POST.

7. A method of using a read/writable memory, formed on a semiconductor chip with a microprocessor, prior to the completion of a power-on, self-test(POST) program set in the read-only memory (ROM) of the microprocessor to test a plurality of hardware interrupts, initiated by a plurality of corresponding devices and components of devices, of the microprocessor, comprising the steps of:

(a) loading the read/writable memory with a plurality of interrupt vectors corresponding to the plurality of interrupts, and a physical address for each of the vectors corresponding to the address of a diagnostic interrupt service routine:

(b) causing a selected device of the plurality of corresponding devices to initiate an interrupt signal;

(c) generating the interrupt vector from the microprocessor in response to reception of the interrupt signal;

(d) accessing the read/writable memory;

(e) reading out the physical address in the read/writable memory at the interrupt vector; and (f) performing the diagnostic interrupt service routine at the physical address.

8. The method of claim 7 wherein the step of accessing the read/writable memory comprises the steps of:

(d)(i) inserting a ROM diagnostic interrupt vector table comprising a list of the interrupt vectors into the POST; and (ii) inserting a master handler into the POST.

9. The method of claim 8 wherein the step of accessing the read/writable memory further comprises the steps of:

(d)(iii) reading the interrupt vector in the ROM diagnostic interrupt vector table and jumping to the master handler;

(iv) recognizing the coded interrupt number by the master handler for reading from the diagnostic interrupt vector table.

10. The method of claim 9 wherein the step of performing the diagnostic service routine at the physical address comprises the additional step of:

(f)(i) inserting a table of diagnostic interrupt service routines into the POST, each routine having a unique physical address.

11. The method of claim 10 further comprising the steps of:

providing the microprocessor with the address of the ROM diagnostic interrupt vector table;

storing the information being worked on by the microprocessor in a general purpose register when the interrupt signal is received; and having the microprocessor point to the address of the ROM diagnostic interrupt vector table.

12. The method of claim 11 further comprising the final step of retrieving the stored information on which the microprocessor may continue to work.

\* \* \* \* \*